No. 740,940. PATENTED OCT. 6, 1903.
W. T. SMITH.
LOADING OR UNLOADING APPARATUS.
APPLICATION FILED MAR. 4, 1903.
NO MODEL. 3 SHEETS—SHEET 2.
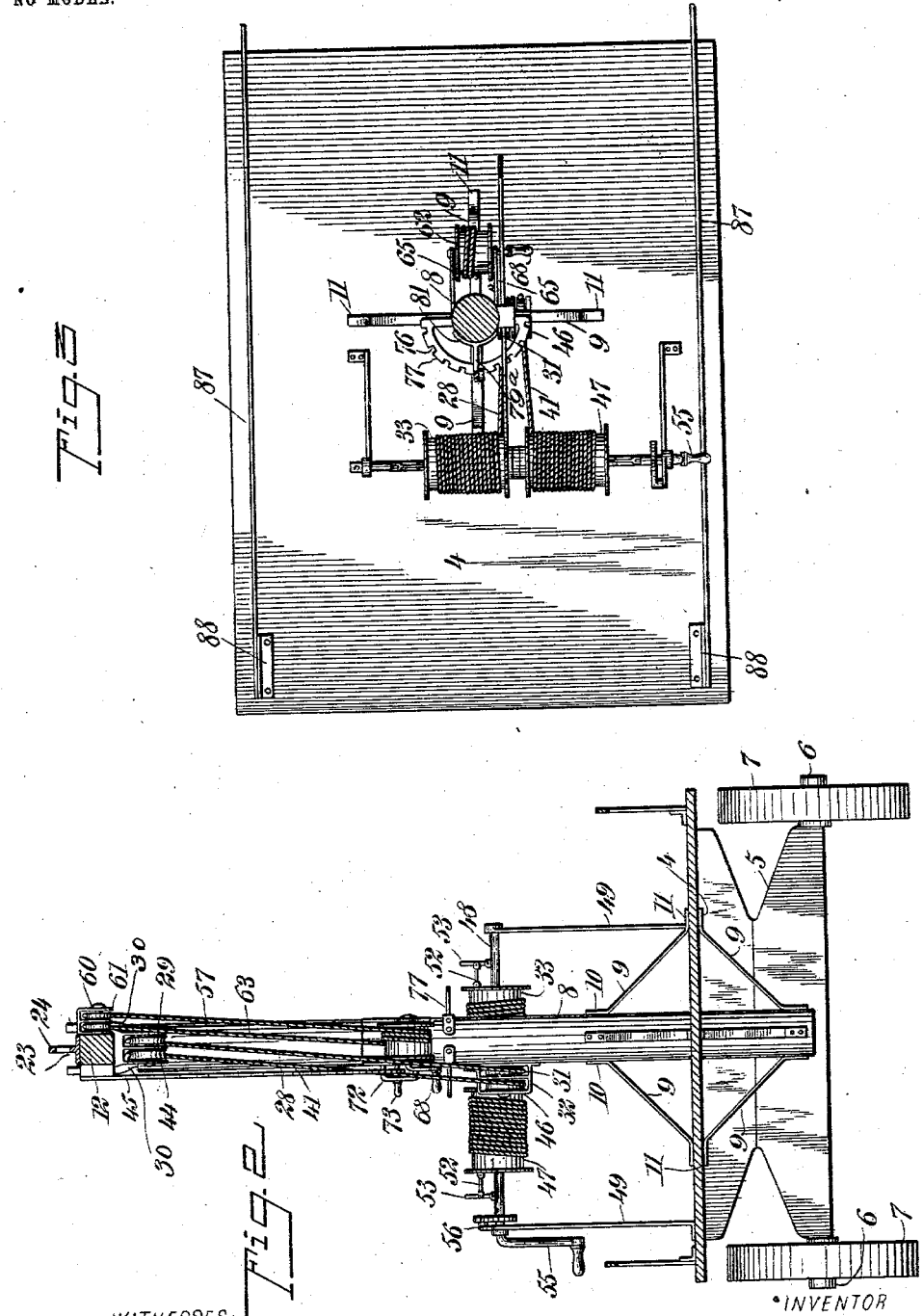
WITNESSES:
INVENTOR
William T. Smith
BY
ATTORNEYS.

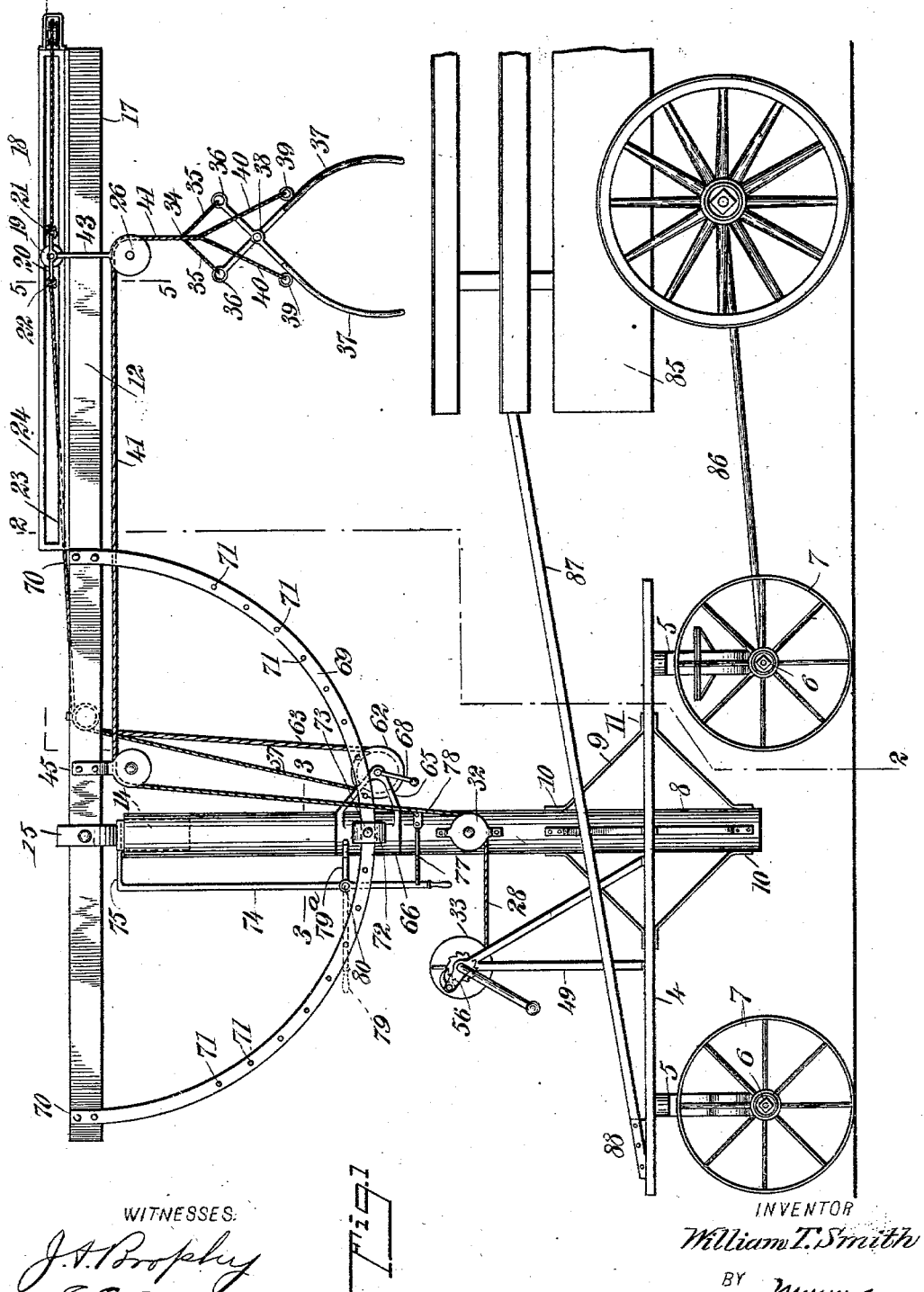

No. 740,940. PATENTED OCT. 6, 1903.
W. T. SMITH.
LOADING OR UNLOADING APPARATUS.
APPLICATION FILED MAR. 4, 1903.
NO MODEL. 3 SHEETS—SHEET 3.
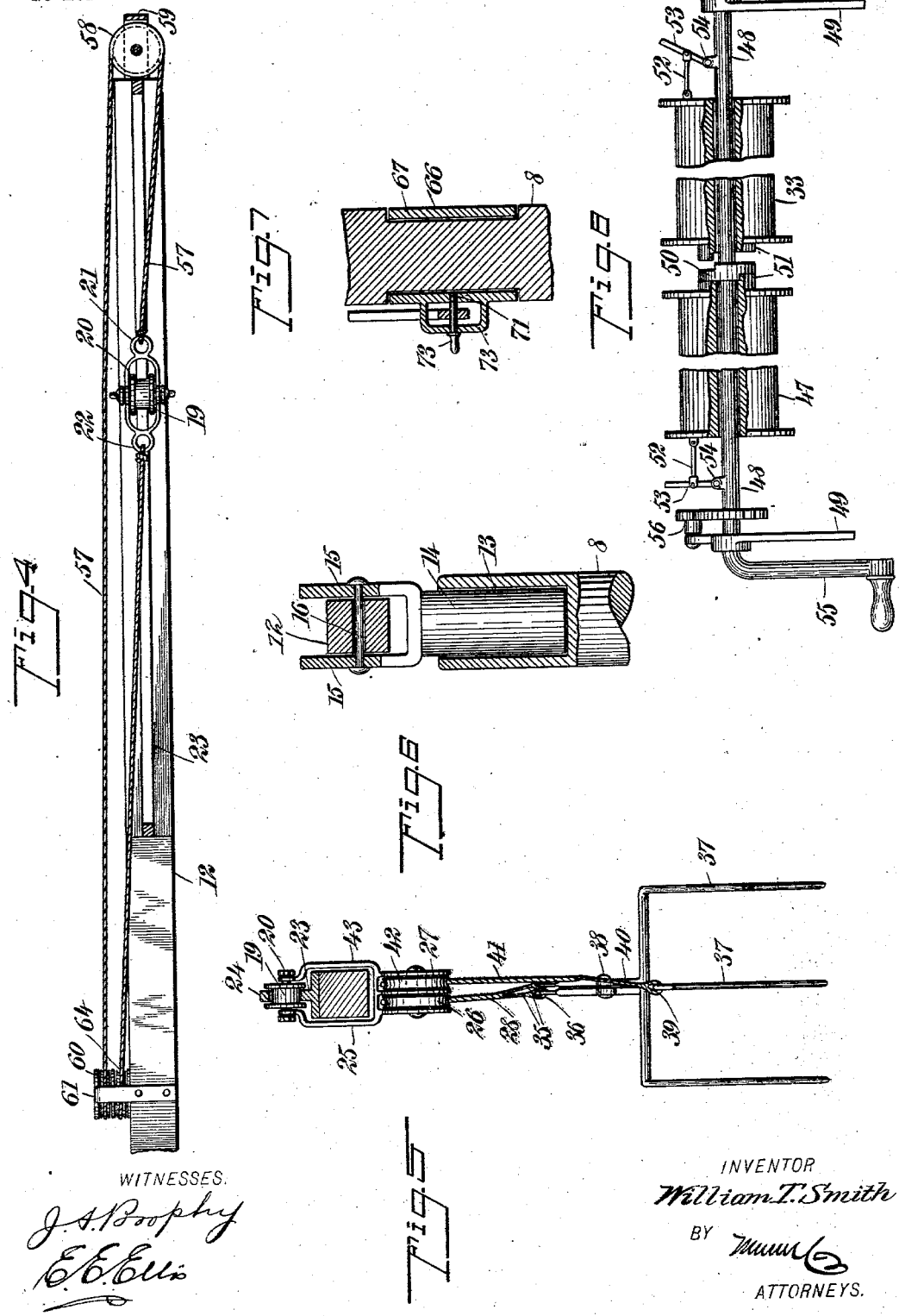
WITNESSES.
INVENTOR
William T. Smith
BY
ATTORNEYS.

No. 740,940.

Patented October 6, 1903.

UNITED STATES PATENT OFFICE.

WILLIAM T. SMITH, OF AMES, IOWA.

LOADING OR UNLOADING APPARATUS.

SPECIFICATION forming part of Letters Patent No. 740,940, dated October 6, 1903.

Application filed March 4, 1903. Serial No. 146,097. (No model.)

*To all whom it may concern:*

Be it known that I, WILLIAM T. SMITH, a citizen of the United States, and a resident of Ames, in the county of Story and State of Iowa, have invented a new and Improved Loading or Unloading Apparatus, of which the following is a full, clear, and exact description.

This invention relates to apparatus or devices for loading or unloading; and it consists substantially in the construction, organization, and combinations of parts hereinafter particularly described.

Though applicable to different purposes in the arts, my improvements have reference more especially to apparatus or devices for loading and unloading shocks of hay, wheat, barley, and other grain while in the field; and the principal object of my invention is to provide apparatus of the character referred to which is simple in the construction and organization of the several parts or elements of which the same is constituted, besides being thoroughly effective and reliable in operation, as well as capable of easy handling or manipulation.

A further object is to provide apparatus for the purpose named capable of withstanding considerable strain in use and one also which enables the operations of loading and unloading to be accomplished in an expeditious manner and with but little exertion or labor on the part of the operator.

A still further object of the invention is to provide apparatus of this kind adapted for continued service over long periods of time and one also comprising comparatively few parts or elements which are of limited weight in the aggregate and which may be readily replaced by others when worn or broken, besides being easily adjusted to meet the requirements of the varied conditions under which the operations of loading or unloading may be carried out or performed.

The above and additional objects are attained by means substantially such as are illustrated in the accompanying drawings, in which—

Figure 1 is a side view of a loading and unloading apparatus constructed and operating in accordance with my invention. Fig. 2 is a vertical transverse sectional view on the line 2 2 in Fig. 1. Fig. 3 is a horizontal sectional view on the line 3 3 in Fig. 1 and minus the carrier or wagon shown in Fig. 1. Fig. 4 is a sectional plan view of the swinging and vertically-adjustable beam constituting a part of the crane employed in connection with my improved apparatus. Fig. 5 is a transverse sectional view of the beam, taken on the line 5 5 in Fig. 1. Fig. 6 is an enlarged part-sectional view in detail indicating the manner in which the yoke for the swinging adjustable beam is supported in the upper end of the upright or standard forming a part of the crane. Fig. 7 is also a sectional view in detail illustrating the means employed for effecting the turning of the vertically-adjusting devices for the beam simultaneously with the turning of said beam to bring the same into different positions either for the purposes of loading or unloading, and Fig. 8 is a part-sectional view in detail representing the construction and organization of the parts for effecting the winding and unwinding of the cables or chains through the medium of which the fork of my improved apparatus may be raised or lowered.

Before proceeding with a more detailed description it may be stated that in the practice of my invention I preferably employ a suitable truck or vehicle which may be propelled in any suitable manner, but which vehicle is preferably connected to the rear axle of a wagon or other carrier and adapted to receive the load of the shocks of hay, wheat, or other grain, which wagon or carrier may also be drawn or propelled in any suitable way—as, for instance, by horses or other animal power. Mounted upon the vehicle which I employ is an upright or standard constituting one member of a crane, the other member thereof being mounted at the upper end of said upright or standard and capable of being swung or turned thereon in any desired position horizontally. The said latter member of the crane is also capable of vertical adjustments within prescribed limits, and I employ specially-constructed devices for maintaining or securing this member in either of the horizontal or vertical positions to which it may be brought. I also employ a suitable grappling device or fork having connected therewith suitable means whereby the same, together with a load held thereby, may be elevated or raised in any desired position or else lowered accordingly as the operations performed thereby may be that of loading or unloading.

The several parts or elements constituting my improved apparatus are simple both in construction and organization, and while I have herein illustrated a certain preferred embodiment of my invention it will be understood that I am not limited thereto in precise detail, since immaterial changes therein may be resorted to in practice coming within the scope of my invention.

Specific reference being had to the several parts by the designating characters marked thereon, 4 designates the platform of a suitable truck or vehicle, which is mounted upon suitable cross-beams 5 5, on the ends of each of which are journals 6, to which the wheels 7 are applied in the usual or well-known manner. The said platform is formed at a suitable part thereof with an opening through which extends the lower end of an upright or standard 8, which is supported in position by means of a series of stay-rods 9, disposed about the same both above and below the platform and being secured to the standard or upright at 10 and to the said platform at 11, thus furnishing a very strong and secure brace therefor and enabling the said standard or upright to withstand considerable strain both laterally and vertically. This standard or upright constitutes one member of a crane, as will be observed, while the other member thereof is indicated at 12 in the nature of a beam of suitable length and transverse dimensions, suitable means being employed for enabling the said beam to be turned horizontally to any desired position. The said means may be constructed in different ways; but as herein shown I preferably form the upper end of the standard or upright 8 with a recess or socket 13, (see Fig. 6,) and in said socket is fitted a circular plug or stem 14, formed on the under side of a U-shaped frame or yoke 15, between the vertical sides of which the said beam or second-named member 12 of the crane is pivotally supported at a suitable part of its length by means of a pin or bolt 16, passing through openings therefor both in the said sides of the yoke and in the beam. In this way it will be seen that the said beam or member is not only capable of being turned horizontally to any desired position, but that the same is also capable of being raised or lowered upon the pivotal support 16 therefor, so as to bring the extremity 17 of the beam to any desired position vertically. Preferably I provide the said extremity 17 of the beam with a guide 18 of suitable length, and in which works a traveling sheave or pulley 19, which is mounted or supported in a frame 20, having at the ends thereof eye-loops 21 and 22, it being understood that the longitudinal portions 23 and 24 of the said guide 18 practically constitute rails upon which the said pulley 19 may be caused to ride in one direction or the other lengthwise of the said beam 12. Pendent from the sides of the said frame 20 are the hangers 25, supporting at their lower ends duplicate pulleys or sheaves 26 and 27, and passing over the said pulley 26 is a cable or chain 28, which is carried along beneath the beam 12 of the crane to and over a pulley or sheave 29, supported in a hanger 30, attached or secured to one side of the said beam, the said cable or chain 28 being thence carried downwardly and beneath a pulley 31, supported in a frame 32, secured to the side of the standard or upright 8, (see Figs. 1 and 2,) whence this cable or chain 28 is carried to and beneath a drum 33, around which latter the same is wrapped or coiled a sufficient number of times to provide length enough to the cable or chain for all practical purposes in the different operations of loading and unloading. The other end of the cable or chain 28 is split or divided at 34, (see Fig. 1,) and the divided portions 35 thereof are attached or secured at 36 to the upper ends of the tines of a grappling device or fork 37, which are pivoted together at 38. Also secured to the said tines 37 at the points 39 are the ends of similar divided portions 40 of another cable or chain 41, which passes in like manner upwardly and over the pulley or sheave 42, (see Fig. 5,) which is supported by a hanger 43, pendent from the opposite side of the frame 20, said chain or cable 41 being thence carried along beneath the beam 12 in like manner as the cable 28 and passing over a pulley 44, supported by a hanger 45, this chain or cable being thence passed downwardly and beneath a pulley 46, also supported by the frame 32, whence the same is passed to and beneath a drum 47, around which it is coiled or wound a number of times, similarly as the cable 28, already referred to. The said drums 33 and 47 are located upon a shaft 48, supported at the ends in bearings at the upper end of standards 49, (see Figs. 1, 2, and 8,) and formed or provided centrally of the said shaft is one member 50 of a clutch, this member being rigid with the shaft. The inner ends of the drums are each provided with a clutch member 51, adapted for engagement with the said member 50, and the said drums are loose upon the shaft and capable of being moved longitudinally by means of link connections 52 with hand-levers 53, pivotally supported at 54 upon the said shaft, and thus it will be seen that whenever the said hand-levers are operated to move the drums inwardly for effecting engagement of the clutch members of the latter with the clutch member on the shaft all of the said parts will then be capable of rotating together, and thus when the said shaft is turned or rotated in one direction through the medium of the crank or handle 55 at one end thereof the said cables or chains 28 and 41 will be wound upon the said drums 33 and 47, and thus will the fork or grappling device at the free ends of said cables or chains be raised or elevated with any load which the same may have been operated to take up or engage with, as is understood. After thus raising the load by the means described the beam or member 12 of the crane may be swung to any horizontal position desired, whereupon the load may be lowered and deposited at any desired place, a rapid lowering thereof being accomplished by disengaging the clutch members of the drums from the clutch member on the shaft 48, since it will be understood that as soon as the drums are thus released the weight of the load will cause the cables 28 and 41 to rapidly unwind from the said drums. In order to retain the load in any desired vertical height to which the same may be elevated, any suitable means may be employed—such, for instance, as a pawl-and-ratchet device, (indicated at 56, see Figs. 1, 2, and 8,) it being apparent that the pawl will prevent back turning of the shaft by engagement with the ratchet, and whenever it is desired to effect the descent of a load the said pawl is of course released from its engagement with the said ratchet. Referring back to the carriage 20, mounted in the guide upon the longer extremity of the said beam or member 12 of the crane, it will be seen that connected to the eye-loop 21 of said frame is one end of a cable or chain 57, which is passed in the direction of this end of the beam and carried around a pulley 58, mounted in a suitable support 59 therefor on the beam, whence the said chain or cable is carried back to a point near the pivotal support 16 of the beam and over a pulley 60, supported in a frame 61, secured to the side of the beam, thence downwardly beneath a drum 62, around which it is coiled several times, and thence passed upwardly at 63 to and over another pulley 64, also supported by the said frame 61, whence the final portion of this cable or chain is carried outwardly and diagonally across the upper edge of the beam or member 12 of the frame, with the other end thereof attached to the eye-loop 22, as indicated in Figs. 1 and 4. The drum 62 is supported by or has its bearings in the ends of bracket portions 65, formed with or secured to a sleeve 66, which is fitted in a circumferential recess 67, (see Fig. 7,) formed at a suitable height on the standard or upright 8 of the crane, and the shaft of the drum is provided at one end with an operating-handle 68, whereby accordingly as the said drum may be turned in one direction or the other the frame 20 will be drawn upon from that direction, and consequently the pulley 19 will be caused to move nearer to or farther from the standard or upright 8, and in this way the fork or hoisting devices proper may be carried to different positions horizontally both with respect to the standard or upright and the said beam or member 12. The said sleeve 66 may be applied within the circumferential recess 67 in any suitable way, as by shrinking, or else the sleeve may be formed of a strip of metal of suitable dimensions bent to fit the recess and having the connecting edges thereof united or joined in any suitable manner.

I may employ any suitable devices or means for holding or retaining the beam or member 12 of the crane to any vertical position to which the same may be adjusted, such devices or means in the present instance preferably consisting of an approximately semicircular or arc-shaped plate 69, having the ends or extremities 70 thereof secured to one side of the beam or member 12, the said ends or extremities being located on opposite sides of the upright or standard, as clearly indicated in Fig. 1. This arc-shaped plate is provided at intervals with holes or openings 71, and the same works in or passes through a strap or guide 72, formed with or attached to the side of the sleeve 66 and provided with a pin 73, adapted to be inserted in any one of the said holes or openings 71 for the purpose of maintaining the beam or member 12 in positions of vertical adjustment. It is apparent that by tilting said beam either upwardly or downwardly the arc-shaped plate will be moved in the strap or guide 72, and the operation of the elements specified will be fully understood without further explanation.

In order to secure or maintain the beam or member 12 of the crane in any position to which the same may be brought or adjusted horizontally, I employ a rod 74, which is bent at 75 and secured to the plug or stem 14 of the yoke in which the beam is supported, the lower end of this rod being adapted to engage the sides of a series of notches 76, formed in a semicircular or arc-shaped horizontal plate 77, secured at 78 to the standard or upright 8. (See Figs. 1, 2, and 3.) Thus it will be seen that by disengaging the said lower ends of the said rod 74 and then turning the stem or plug 14 in its socket the beam will be carried around horizontally, whereupon by again permitting the lower end of the rod to engage with said plate 77 the beam will be held or maintained in such position. As a means of readily accomplishing this horizontal turning of the beam or member 12 I preferably employ in some instances a hand-lever 79, secured to the said rod 74 at 80 and having a brace 79$^a$ forked at the inner end thereof, (indicated at 81 in Fig. 3,) said end being secured to the side of the sleeve 66, such arrangement serving to maintain the rod 74 in a desired vertical position and operating as a guide in effecting the several operations hereinbefore specifically set forth.

From the foregoing description it will be seen that whenever the beam or member 12 is turned to any position horizontally after releasing engagement of the rod 74 with the notched plate 77 the devices for securing the beam in different vertical adjustments are also turned therewith, and consequently these devices are always maintained in their proper relative positions for effecting vertical adjustments of the beam at any of the positions in which it may be desired to effect such adjustments. In like manner the several pulleys and supports, together with the several chains or cables referred to, can also be made to conform to these movements or adjustments, as is apparent. Should any slack in the cables or chains 28 and 41 take place through either of the horizontal or vertical adjustments of the beam 12, it is apparent that the same may be readily taken up by properly rotating the drums 33 and 47 in the manner hereinbefore explained.

As before stated, the truck or vehicle upon which my improved apparatus is mounted may be propelled over the field or other surface in any suitable way; but preferably in some instances I connect the forward axle of the truck or vehicle to the rearward axle of a carrier or wagon 85 by means of a rod 86, the said carrier or wagon being for the reception and conveyance of the shocks of hay, grain, or other material taken up from the field to any desired place, when the same may be again unloaded or not, also as desired. In order to prevent tilting of the apparatus in the operation of raising or lowering a load, I preferably employ two or more braces 87, one end of each of which is secured to the rearward end of the platform 4 of the truck or vehicle, as indicated at 88, while the other ends of said braces are secured to the rearward end of the wagon or carrier in any suitable manner.

As thus described and illustrated, it is thought the construction and organization of the several parts or elements contributing to my improvements will be fully understood, as well, also, as the operation thereof, and while I have herein represented certain preferred embodiments of my invention it will be understood that I am not limited to the precise details thereof in practice, since immaterial changes therein may be resorted to and still come within the scope of my invention.

On lowering the grappling device by means of the cables 28 and 41 the tines thereof will be caused to spread apart, as is apparent, thereby enabling the device to embrace the sides of a load—as a shock of wheat, for instance—whereupon by drawing upon said cables the load will be lifted. A sufficient slack is produced in the cables each time the device is lowered by which to enable the tines to be spread apart to receive the load, and said tines are caused to grapple the load by the lifting force applied to the cables, the cables at the same time being caused to straighten out by the weight of the load. By again depositing the load on a rest or support therefor and then slacking the cables said load may be readily released, since the tines are then again free to be spread apart.

Having thus described my invention, I claim as new and desire to secure by Letters Patent—

1. In loading and unloading apparatus, an upright or standard, a beam having rotary horizontal movement upon the same, and also having swinging vertical movement with respect thereto, means for securing the beam at different horizontal adjustments thereof, and means for also securing the same at different vertical adjustments.

2. In loading and unloading apparatus, an upright or standard, a vertically-swinging beam having rotary horizontal movement upon the upper end of the same, and means for securing said beam at any desired position horizontally, comprising a horizontally-disposed notched plate rigid with the standard, and a vertically-depending hand-operated rod rigid with said beam and adapted to engage the notches of said plate.

3. In loading and unloading apparatus, an upright or standard, a pivoted beam having vertical movement with respect thereto, and means for securing said beam at different adjustments thereof, comprising a guide on the standard, an arc-shaped plate working in said guide and having the ends thereof fastened to the beam on opposite sides of said standard, and means passing through said guide for engaging said plate.

4. In loading and unloading apparatus, an upright or standard, a pivoted beam having swinging vertical movement with respect thereto, and means for securing said beam at different adjustments thereof, comprising a guide on the standard, an arc-shaped plate working in said guide and having its ends fastened to the beam on opposite sides of the standard, said plate having holes or openings therein, and a pin passing through the guide, adapted to enter said openings.

5. In loading and unloading apparatus, an upright or standard, a beam having rotary horizontal movement upon the same, and also having swinging vertical movement with respect thereto, means for securing the beam at different horizontal adjustments thereof, comprising a horizontal arc-shaped notched plate attached to the standard, and a rod engaging the same; and means for securing said beam at different vertical adjustments thereof, comprising a guide rotatable about the standard, a vertically-disposed arc-shaped plate working in said guide with its ends fastened to the beam on opposite sides of said standard, and means for engaging said last-named plate.

6. In loading and unloading apparatus, an upright or standard formed with a socket in the upper end thereof, a yoke having a plug or stem rotatably fitting in said socket, a beam pivoted between the sides of said yoke and having vertical movement in the latter, means for securing the beam in different horizontal positions; and means for securing the same in different vertical positions, comprising a guide rotatable on the standard, an arc-shaped plate working in the guide secured at its ends to the beam, and means for engaging said plate.

7. In loading and unloading apparatus, an upright or standard, a vertically-swinging beam having rotary horizontal movement upon the same, a traveling pulley on the beam, a fork or grappling device suspended from the frame of said pulley, means for moving the pulley at different vertical positions with respect to the standard, means for raising and lowering said fork, means for securing the beam at different horizontal adjustments thereof, and means also for securing the same at different vertical positions thereof.

8. In loading and unloading apparatus, an upright or standard, a beam having rotary horizontal movement thereupon, and also having a swinging vertical movement with respect thereto, a pulley adapted to travel back and forth on the longer extremity of the beam, a fork or grappling device suspended from the beam to partake of the movements of said pulley, means for operating the pulley to be moved to different positions on the beam, means for raising and lowering the fork or grappling device, and means for securing the beam in each of the horizontal and vertical positions to which it may be adjusted.

9. In loading and unloading apparatus, an upright or standard, a beam having rotary horizontal movement upon the same, a pulley adapted to travel back and forth upon the beam, a fork or grappling device suspended from the beam to partake of the movements of said pulley, means for moving the pulley to different positions with respect to the standard, means for raising and lowering the said fork or grappling device; and means for securing the beam in different positions of adjustment, comprising a notched arc-shaped plate on the beam, and a rod connected with the beam and adapted to engage the sides of said notches.

10. In loading and unloading apparatus, an upright or standard, a beam having swinging vertical movement with respect thereto, a pulley adapted to travel back and forth upon the beam, a fork or grappling device suspended from the beam to partake of the movements of said pulley, means for moving the pulley to different positions on the beam, means for raising and lowering the fork or grappling device, and means for securing the beam in different positions of adjustment, comprising a guide on the standard, a vertically-disposed arc-shaped plate working in said guide and having its ends fastened to the beam, and means for securing said plate at different positions within said guide.

11. In loading and unloading apparatus, an upright or standard, a beam adapted for rotary horizontal movement thereupon, and also having swinging vertical movement with respect thereto, means for securing said beam in different positions horizontally, and means for securing the same at different positions vertically, said latter means partaking of the rotary movements imparted to the beam.

12. In loading and unloading apparatus, an upright or standard, a vertically-swinging beam adapted for rotary horizontal movement thereupon, means for securing said beam in either of the vertical or horizontal positions to which it may be carried, a grappling device suspended from the beam, cables or chains for raising and lowering said device, guide pulleys or sheaves over and beneath which said cables or chains are carried, a shaft, duplicate drums loosely mounted on the latter and upon which said cables or chains are wound, and means for effecting engagement and disengagement of said drums with and from the shaft.

13. In loading and unloading apparatus, an upright or standard, and a drum supported thereby, a vertically-swinging beam having rotary horizontal movement with respect to said standard, a pulley adapted to travel back and forth upon the beam, and duplicate guide-pulleys on the side of the latter, and a similar pulley at the end thereof, a cable or chain connected at one end to the forward end of said frame, thence passing over the end guide-pulley and to and over one of said duplicate guide-pulleys, thence to and around said drum, thence reversely over the other duplicate guide-pulley and having its other end secured to the other end of said frame.

14. In loading and unloading apparatus, a truck or vehicle, a standard or upright mounted thereon, a vertically-swinging beam supported thereby and having rotary horizontal movement with respect thereto, a fork or grappling device, means for raising and lowering the latter, means for moving the point of suspension thereof to different positions with respect to the standard, means for securing the beam in different horizontal adjustments, and means for securing the same in different vertical adjustments.

15. In loading and unloading apparatus, an upright or standard, a beam having rotary horizontal movement with respect thereto, and means for securing the same in position, a grappling device, a cable or chain for raising and lowering the same, said means partaking of the movements of the beam, and comprising a sleeve turning in an annular recess in the standard, and a drum supported by said sleeve and around which portions of said cable or chain are wound.

In testimony whereof I have signed my name to this specification in the presence of two subscribing witnesses.

WILLIAM T. SMITH.

Witnesses:
CLYDE W. SMITH,
PAUL SMITH.